United States Patent [19]
Norton

[11] Patent Number: 5,950,350
[45] Date of Patent: Sep. 14, 1999

[54] FISHING HOOKS AND LURES

[75] Inventor: Don S. Norton, Clinton, Miss.

[73] Assignee: United Plastic Molders, Inc., Jackson, Mich.

[21] Appl. No.: 08/899,604

[22] Filed: Jul. 24, 1997

[51] Int. Cl.[6] .................................................. A01K 83/00
[52] U.S. Cl. ........................... 43/43.6; 43/42.42; 43/43.4
[58] Field of Search ................... 43/42.4, 42.41, 43/42.42, 43.2, 43.4, 43.6

[56] References Cited

U.S. PATENT DOCUMENTS

| | | | |
|---|---|---|---|
| 2,590,167 | 3/1952 | Fasano et al. | 43/42.51 |
| 3,497,988 | 3/1970 | Childers | 43/43.4 |
| 3,562,948 | 2/1971 | Santo et al. | 43/43.4 |
| 3,605,318 | 9/1971 | Santo et al. | 43/43.4 |
| 3,834,060 | 9/1974 | Wagenknecht | 43/44.8 |
| 4,848,024 | 7/1989 | Hanson | 43/44.82 |
| 4,914,852 | 4/1990 | Hnizdor | 43/44.82 |
| 4,922,645 | 5/1990 | Hannon et al. | 43/42.4 |
| 5,596,831 | 1/1997 | McWethy, Jr. | 43/42.36 |

*Primary Examiner*—Jack W. Lavinder
*Attorney, Agent, or Firm*—Nixon & Vanderhye P.C.

[57] ABSTRACT

Fishhooks include a wire element which encircles the shank rearwardly of the fishhook's main barb. The wire element is preferably in the form of an elongate loop having a slide element capable of slidable movements therealong to allow for size adjustment of the wire element loop and thereby prevent it from becoming disengaged. The wire element thus retains its weed-guard position when being trolled through even relatively dense underwater vegetation. At the same time, however, the reduced-size wire element loop allows the wire element to pivot laterally in response to increased pressure thereagainst (e.g., as occurs when a fish strikes the hook) and thereby expose the point for penetration into the striking fish. Alternatively or optionally, the fishhooks include significantly longer and larger shank barbs than those capable of being obtained through conventional fabrication techniques. Thus, an enlarged shank barb may be provided by a separate auxiliary wire member which is bent so as to include shorter and longer legs positioned adjacently parallel to one another. The terminal end of the longer leg includes a rearwardly bent portion forming the shank barb. The longer and shorter legs are then secured to the fishhook shank by a section of heat-shrunk tubing.

29 Claims, 5 Drawing Sheets

FISHING HOOKS AND LURES

FIELD OF THE INVENTION

The present invention relates generally to fishhooks and lures. More particularly, the present invention relates to fishhooks and lures which include anti-snag structures (i.e., so-called "weed guards") and/or shank barbs.

BACKGROUND AND SUMMARY OF THE INVENTION

Fishhooks and lures which include weed guard structures are well known. In this regard, conventional weed-guarded fishhooks include a relatively stiff, but inherently resilient, wire element attached at one of its ends to or near the eyelet end of the fishhook. The wire element is sufficiently long so that its free terminal end (i.e., that end which is opposite to the attached end) is capable of being brought into engagement with the fishhook's point. The inherent resiliency of the wire element thus causes the free terminal end to be biased into engagement with the fishhook's point. Since the wire element extends between the eyelet end of the fishhook and its point, the fishhook is essentially "guarded" against entanglement with weeds and other underwater vegetation and/or debris that may be present in the fishing area.

Conventional weed-guarded fishhooks, however, are somewhat problematic since it only takes slight pressure against the wire element to cause it to trip out of engagement with the fishhook's point, thereby defeating its weed-guarding functions. As a result, conventional weed-guarded hooks oftentimes offer only minimal protection against underwater weed snags.

Conventional fishhooks are also known which include one (or more) shank barbs to assist in maintaining live bait on the hook and/or to enhance its hooking power and reliability. However, traditional shank barbs are typically formed by partially cutting a portion of the shank material and then bending the partially cut region outwardly to form a barb which is unitary with the shank. Thus, the size of the shank barb is limited by the nominal shank diameter of the fishhook. That is, conventional shank barbs cannot be so large as to adversely compromise the shank's structural integrity since partially cutting a portion of the shank will necessarily weaken it at that location.

It would therefore be especially desirable if weed-guarded hooks could be provided which more reliably guard the fishhook against entanglement with weeds or other underwater vegetation and/or debris. Furthermore, it would be desirable if fishhooks could be provided with shank barbs of desired size without compromise to the structural integrity of the shank itself. It is towards providing fishhooks which include such improved characteristics that the present invention is directed.

Broadly, according to one aspect of the present invention, improved weed-guarded fishhooks are provided which include a wire element which encircles the shank rearwardly of the fishhook's main barb. In preferred embodiments, the wire element is in the form of an elongate loop having a slide element capable of slidable movements therealong to allow the size adjustment of the wire element loop. Thus, the wire element loop which encircles the shank rearwardly of the fishhook's main barb can be sized to prevent the wire element from becoming disengaged. The wire element thus retains its position when being trolled through even relatively dense underwater vegetation. At the same time, however, the reduced-size wire element loop is sufficiently flexible so that the wire element may pivot laterally in response to increased pressure thereagainst (e.g., as occurs when a fish strikes the hook) to allow the point and barb of the hook to set in the fish.

Alternatively, or optionally, the fishhooks of this invention include significantly longer and larger shank barbs than those capable of being obtained through conventional fabrication techniques. Thus, according to this aspect of the present invention, an enlarged shank barb may be provided by a separate auxiliary wire member which is most preferably bent so as to include shorter and longer legs positioned adjacently parallel to one another. The terminal end of the longer leg includes a rearwardly bent portion forming the shank barb. The longer and shorter legs are then secured to the fishhook shank by suitable adhesive, bonding or overwrapping. Preferably, however, a section of heat-shrinkable tubing is inserted over the shank so as to cover the longer and shorter legs of the auxiliary wire member. Subsequent heat shrinking of the tubing section will thus securely attach the auxiliary wire member to the fishhook shank.

These and other aspects and advantages of the present invention will become more clear after careful consideration is given to the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structure elements, and wherein.

DETAILED DESCRIPTION OF THE INVENTION

Figure 1:
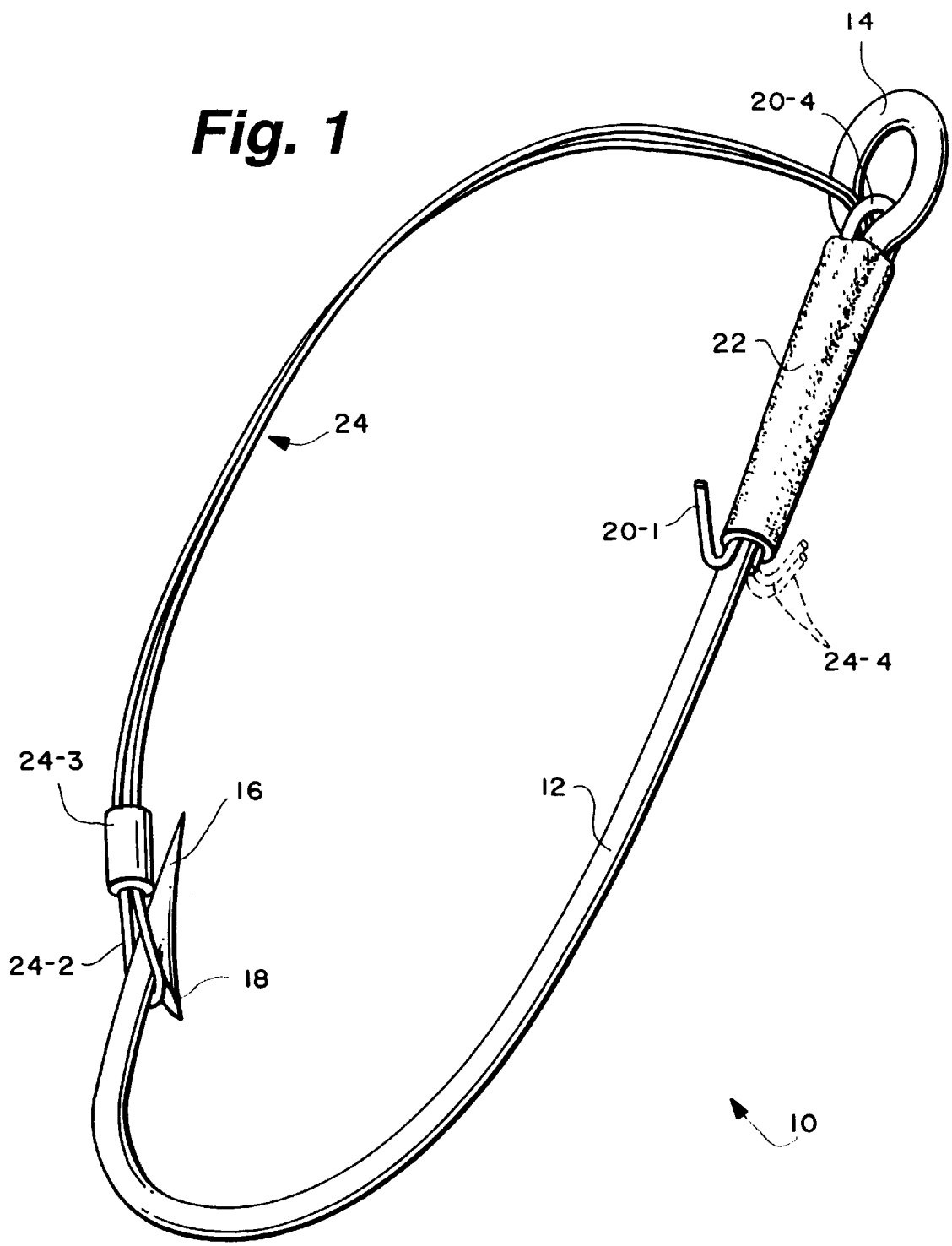
FIG. 1 is a perspective view of an improved fishhook according to one embodiment of the present invention.

Accompanying FIG. 1 depicts one presently preferred embodiment of a fishhook 10 in accordance with the present invention. In this regard, the fishhook 10 (which may hereinafter sometimes more simply be referred to as a "hook") includes an elongate rigid J-shaped shank 12 integrally having an eyelet 14 at its rearwardmost end to allow attachment to a fishing line and a sharpened point 16. As is conventional, a one-piece primary barb 18 extends rearwardly relative to the point 16.

A secondary barb 20-1 associated with an auxiliary wire member 20 (see FIG. 1b) is attached to the shank 12 near the eyelet end 14 of the hook 10 by means of a heat-shrunk tubing section 22. Other suitable and equivalent attachment means include adhesive bonding, soldering and overwrapping (e.g., with wire, tape or the like). The tubing section 22 is shown in FIG. 1 in a post-heat-shrunk condition. As will be described in greater detail below, the tubing section 22 is of larger nominal diameter prior to heat-shrinking to allow it to be sleeved over the shank 12 and auxiliary wire member 20. The tubing section 22 is, in and of itself, conventional in that it is formed of a suitable plastics material which dimensionally shrinks (contracts) upon application of sufficient heat.

The tubing section 22 also attaches the rearward ends 24-1 (see FIG. 1c) of an elongate wire element 24 securely to the shank 12 near the eyelet end 14 of the hook 10. As is shown, the wire element 24 is a length of wire doubled back onto itself so as to form an elongate loop between its fixed ends 24-1 (see FIGS. 1c and 1d) near the eyelet 14 and its terminal free end 24-2. The size of the loop may, however, be adjusted by a slide member 24-3 which is sleeved over, and thus slidable along, the wire element 24. The overall length of the wire element 24 is thus sufficient to span the distance between the eyelet 14 at the rearward end of the shank and the primary barb 18 located at the forward end of the shank 12. That is, the wire element 24 is of sufficient overall length to enable the loop formed at its terminal free end 24-2 to encircle the shank 12 immediately rearwardly of the primary barb 18. Moving the slide element 24-3 so that it is positioned rearwardly of the point 16 (i.e., so the size of the loop at the terminal end 24-2 is smaller than the combined elongate dimension of the point 16 and barb 18) will thus essentially positionally retain engagement between the wire element 24 and the shank 12. As such, the wire element 24 will reliably serve its weed-guard functions— that is, the point 16 of the hook 10 will essentially be guarded against snags with underwater vegetation during normal hook trolling since the pressure exerted against the wire element 24 by such underwater vegetation will be insufficient to laterally displace the wire element relative to the shank 12. However, upon the application of substantial abnormal pressure—i.e., that occurs when a fish strikes the hook—the reduced size loop at the terminal end 24-2 of the wire element 24 will allow the wire element to rotate about the shank 12 until it is positioned laterally of the shank 12. As such, the point 16 will essentially be exposed allowing penetration into the striking fish.

Virtually any relatively stiff (but sufficiently axially flexible) wire can be employed for the wire element 24. Preferably, the particular gage of the wire element 24 can be selected to provide different levels of pressure "release" so as to suit different underwater fishing environments. The wire element 24, may thus be formed from mono or multifilamentary metal or synthetic polymeric (e.g., nylon) wires as may be desired. Presently, a monofilamentary stainless steel wire is preferred having between about 15 to about 50 pound tests, and more preferably between about 17 and about 40 pound tests.

The secondary barb 20-1 may be either substantially rigid or flexible in dependence upon the particular gauge of the auxiliary wire member 20 from which it is formed. Thus, for a relatively rigid secondary barb 20-1, the auxiliary wire member 20 may have a nominal diameter of at least about 0.020", and more preferably between about 0.024 to about 0.034". In order to provide for a flexible secondary barb 20-1, the auxiliary wire member should of a gauge similar to that described above with respect to the wire element 24. Most preferably, the auxiliary wire is a stainless steel monofilament wire.

Optionally (or alternatively), auxiliary barbs 24-4 may be formed by the turned-back (e.g., toward the eyelet 14) ends 24-1 of the wire element 24. In such a situation, the ends of the wire element 24 will be of sufficient length to protrude beyond the heat shrunk tubing so that they be subsequently bent (crimped) rearwardly to thereby form the barbs 24-4. The length of the barbs 24-4 can therefore be as short or as long as may be desired and, moreover, will exhibit the same axial flexibility as the wire element 24 (i.e., since they are formed as a one-piece structure therewith). The auxiliary barbs 24-4 may be positioned closely together as depicted in FIG. 1 (e.g., so as to present the appearance of a single barb structure), or may be spread apart from one another (e.g., so as to present multiple separate barb structures).

Figure 1A:
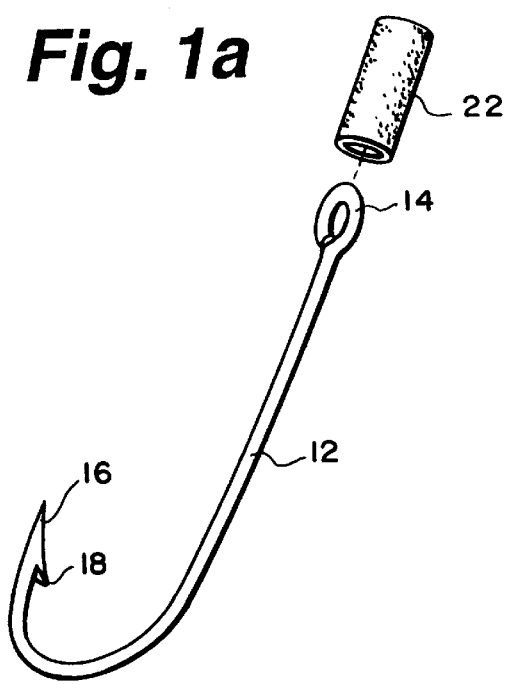
FIGS. 1a through 1e depict the manufacturing process for making the fishhook shown in FIG. 1.
Figure 1B:
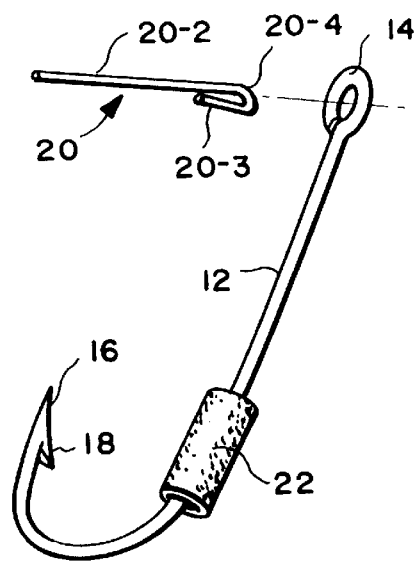
Figure 1C:
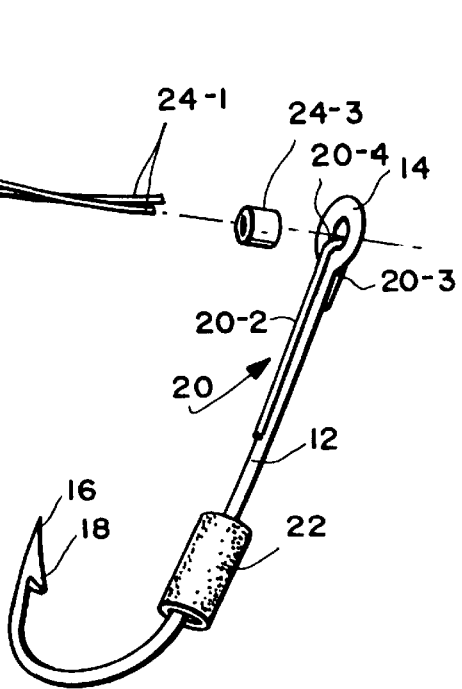
Figure 1D:
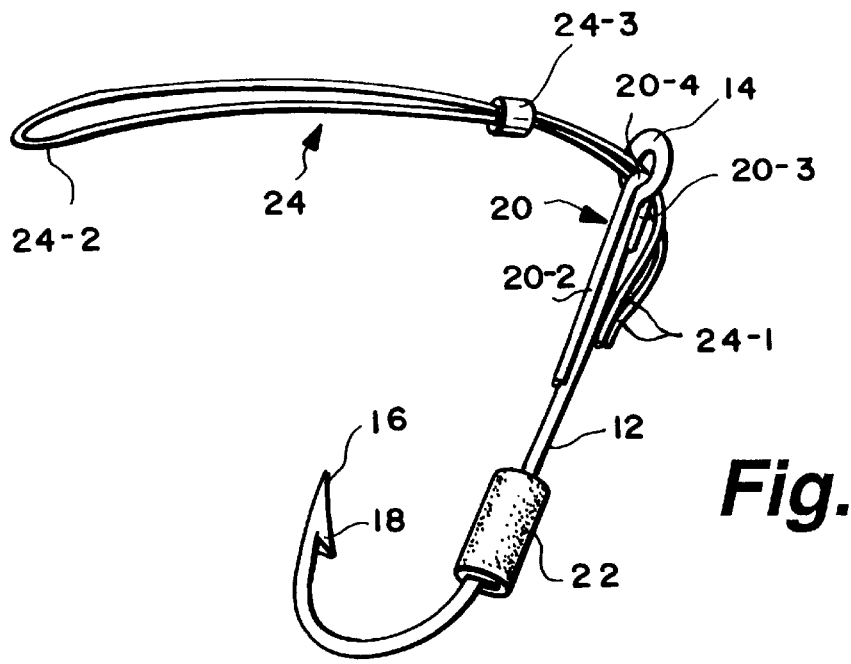
Figure 1E:
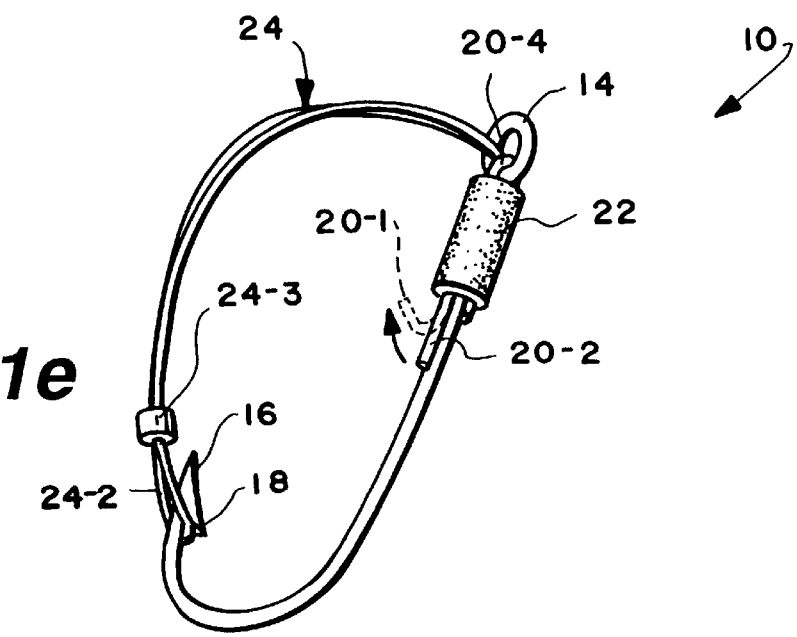

Accompanying FIGS. 1a through 1e show a preferred manufacturing technique for assembling the hook 10 described previously. In general, as shown in FIG. 1a, the eyelet end 14 of the hook 10 is inserted into the heat-shrinkable section of tubing 22. An auxiliary wire member 20 preliminarily bent in such a fashion to have adjacent substantially parallel longer and shorter legs 20-2 and 20-3, respectively. As shown in FIGS. 1b and 1c, the bend 20-4 of the auxiliary wire member 24 is inserted through the eyelet end 14 and positioned so that each of the legs 20-2, 20-3 is positioned closely adjacent and parallel to the shank 12. The ends 24-1 of the wire element 24 are first inserted into slide member 24-3 and thereafter through the eyelet end 14 of the hook 10 and are likewise bent to lie closely adjacent and parallel to the shank 12 (and legs 20-2, 20-3 of the auxiliary wire member 20) as shown in FIGS. 1c and 1d. Thereafter, the tubing section 22 may be heat-shrunk so as to securely attach the auxiliary wire member 20 to the shank 12. An end section of the longer leg 20-2 may therefore be bent rearwardly as shown in FIG. 1e so as to form the secondary barb 20-1. As can be appreciated, the barb 20-1 may be virtually any desired length in dependence upon the length of the longer leg 20-2. Also, although a single secondary barb 20-1 associate with a single auxiliary wire member 20 has been shown and described, it will be understood that multiple such barb could also be provided—e.g., by providing the auxiliary wire member with a pair of legs that are substantially the same length and then bending each leg end and/or by providing a shorter length section of tubing 22 so that the shorter leg section 20-3 is likewise exposed therebeyond to allow its end to be bent into a secondary barb and/or by providing multiple auxiliary wire members 20 each secured to the shank 12.

Figure 2:
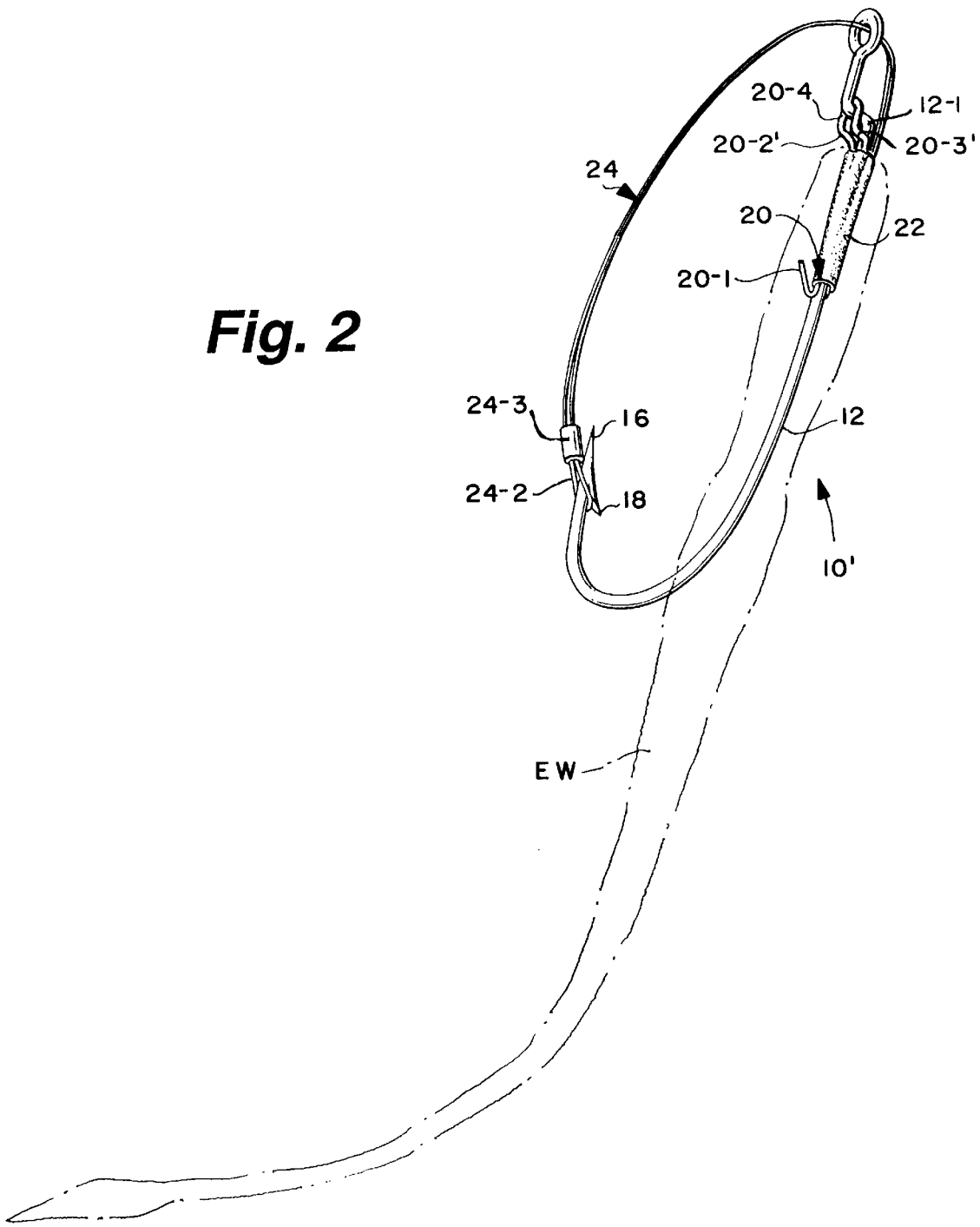
FIG. 2 is a perspective view of another embodiment of a fishhook according to the present invention which is especially adapted for use with live or synthetic bait.
Figure 2A:
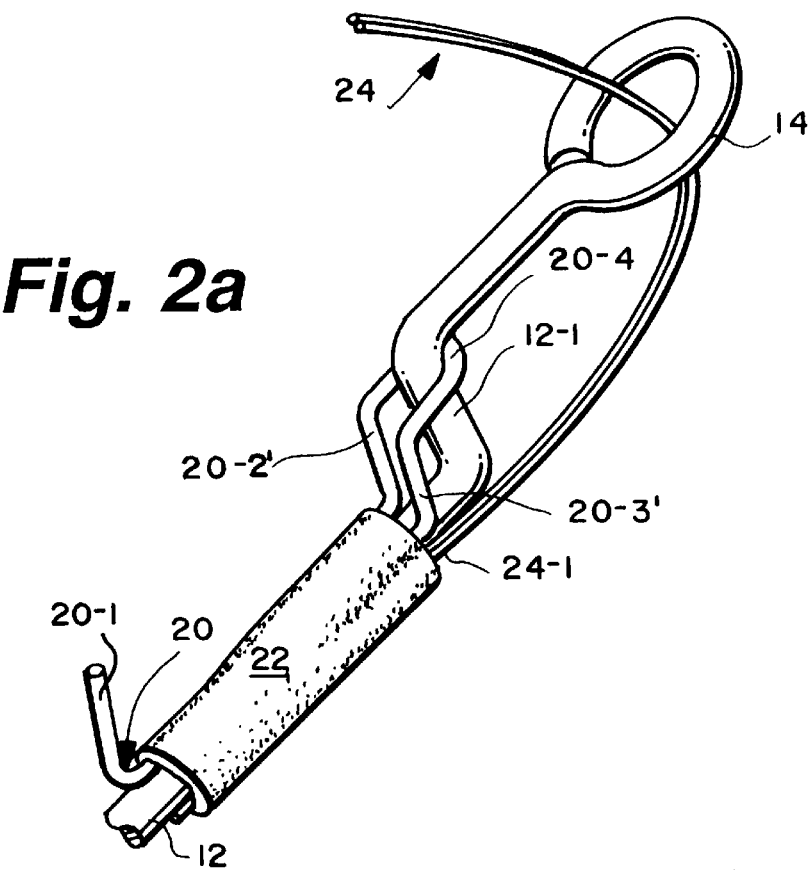
FIG. 2a is an enlarged view of the eyelet end of the fishhook depicted in FIG. 2.

Accompanying FIGS. 2 and 2a show another exemplary embodiment of a fishhook 10' according to the present invention which is especially well suited for use as a hook for live bait, such as an earthworm depicted in phantom line in FIG. 2 and identified by reference EW. Synthetic facsimiles of such live bait may also be employed in combination with the hook 10'. As is shown, the hook 10' is comprised of essentially the same structural components as those discussed above with regard to FIG. 1, and have been identified in FIGS. 2 and 2a by the same reference numerals. A principal difference, however, is that the shank 12 of hook 10' is provided with a pair of 90° successive bends near the eyelet end 14 so as to form an upright section 12-1. The eyelet end 14 is thus axially offset with respect to the shank 12. Similarly, the longer and shorter legs 20-2 and 20-3 are each provided with a pair of successive 90° bends forming respective sections 20-2' and 20-3', respectively, so that the legs 20-2 and 20-3 are positioned closely adjacent and parallel to the shank forwardly of the upright section 12-1 and so that the bend 20-4 is axially offset relative thereto. The bend 20-4 of the auxiliary wire member thus positions the auxiliary wire element adjacent the shank 1 without being inserted through the eyelet end 14 of the hook 10'.

Figure 3:
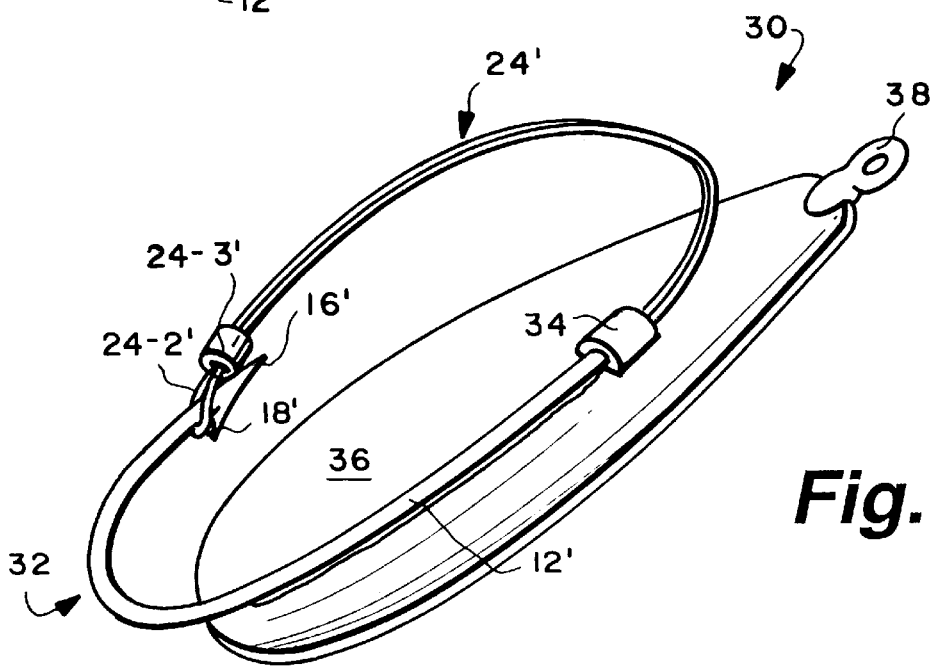
FIG. 3 is bottom perspective view showing one possible lure configuration which employs the fishhook of the present invention.

FIG. 3 depicts an exemplary lure 30 which includes a hook 32 which is rigidly attached, for example, via an area 34 of epoxy, bonding, soldering or the like, to a lure body 36 (which just happens to be depicted as a so-called lure spoon). The forward end of the lure body 36 is provided with an eyelet 38 for attachment to a fishing line. The hook 32 essentially includes similar structural components to those described above with regard to FIG. 1. Thus, those similar structural components have been identified the same reference numerals in FIG. 3, but include a prime designation (') thereafter for clarity of description. As can be seen, therefore, the ends 24-1 of the wire element 24 may be embedded into the bonding area 34 and thereby attached fixedly to the lure body 36.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fishhook comprising:
   a shank;
   a shank barb; and
   a heat-shrunk tubing section which positionally fixes said shank barb to said shank, wherein
   said shank barb includes an auxiliary wire member having a bend and a pair of leg sections, one of said leg sections including a rearwardly bent section forming a shank barb segment.

2. The fishhook of claim 1, wherein said pair of leg sections is surround by said heat-shrunk tubing section and positionally fixed to said shank thereby.

3. The fishhook of claim 1, wherein one of said leg sections is longer as compared to another of said leg sections.

4. The fishhook of claim 1, wherein said shank barb is substantially rigid.

5. The fishhook of claim 1, wherein said shank barb is flexible.

6. In a fishhook having a J-shaped shank, a forward point and a rearwardly extending primary barb near said point, the improvement comprising a weed guard having an elongate wire loop of sufficient length to encircle the shank rearwardly of said primary barb, and a slide element sleeved over said elongate wire loop and slidable therealong for loop size adjustment.

7. The fishhook of claim 6, the improvement further comprising a heat-shrunk tubing section sleeved over one end of said elongate wire loop and over a forward end of said shank to positionally fix said one end of said wire loop to said shank.

8. The fishhook of claim 6, the improvement further comprising a shank barb.

9. The fishhook of claim 8, the improvement wherein said shank barb is a turned-back end segment of said weed guard.

10. The fishhook of claim 8, the improvement wherein said shank barb includes an auxiliary wire member having one leg fixed to said shank and bent at one end thereof to form a shank barb section.

11. The fishhook of claim 10, the improvement further comprising a heat-shrunk tubing section sleeved over said one leg of said auxiliary wire member and over a forward end of said shank to positionally fix said one leg of said auxiliary wire member to said shank.

12. The fishhook of claim 10, the improvement wherein said auxiliary wire member includes a bend and a pair of legs oriented substantially parallel to one another and to said shank.

13. The fishhook of claim 12, the improvement wherein said shank has a pair of successive 90° bends to form therebetween an upright section of said shank, and wherein said bend of said auxiliary wire member is engaged with said upright section.

14. The fishhook of claim 12, the improvement wherein said shank has an eyelet at a rearward end of said shank, and wherein said bend of said auxiliary wire member is engaged with said eyelet.

15. A lure which includes a fishhook of claims 6, 7, or 8.

16. The fishhook of claim 6, wherein said wire guard is a monofilamentary or multifilamentary metal or synthetic plastics wire.

17. A fishhook comprising:
    a shank having forward and rearward ends;
    a wire guard being of sufficient length between one and another ends thereof so as to span between said forward and rearward ends of said shank;
    a heat-shrunk tubing section sleeved over said one end of said wire guard and said rearward end of said shank so as to attach said one end of said wire guard to said rearward end of said shank, and
    a plurality of shank barbs formed by turned-back end segments of said wire guard which extend beyond said heat-shrunk tubing.

18. The fishhook of claim 17, wherein said wire guard is an elongate loop of sufficient length so that said another end thereof encircles said forward end of said shank.

19. The fishhook of claim 17, wherein said wire guard includes a size-adjustable loop.

20. The fishhook of claim 17, wherein said shank includes a pair of substantially 90° bends which axially offset said rearward end of said shank.

21. A fishhook comprising:
    a shank having forward and rearward ends;
    a wire guard forming a loop of sufficient length between one and another ends thereof so as to span between said forward and rearward ends of said shank; and
    a heat-shrunk tubing section sleeved over said one end of said wire guard and said rearward end of said shank so as to attach said one end of said wire guard to said rearward end of said shank, wherein
    said wire guard includes an elongate wire element and a slide member slidable along said wire element so as to allow for size adjustment of said loop.

22. A fishhook comprising:
    a shank having forward and rearward ends;
    a wire guard being of sufficient length between one and another ends thereof so as to span between said forward and rearward ends of said shank; and
    a heat-shrunk tubing section sleeved over said one end of said wire guard and said rearward end of said shank so as to attach said one end of said wire guard to said rearward end of said shank, wherein
    said wire guard is an elongate wire element bent to form an elongate loop between adjacent ends thereof, and wherein said wire guard includes a slide member sleeved over said elongate wire element to permit size-adjustment of said elongate loop.

23. A fishhook comprising:
    a shank having forward and rearward ends;
    a wire guard being of sufficient length between one and another ends thereof so as to span between said forward and rearward ends of said shank;
    a heat-shrunk tubing section sleeved over said one end of said wire guard and said rearward end of said shank so as to attach said one end of said wire guard to said rearward end of said shank; and a shank barb, wherein said shank barb is formed of an auxiliary wire member which integrally includes a bend, a pair of leg sections, and a shank barb segment formed by a rearwardly extending bend of one of said leg sections.

24. The fishhook of claim 23, wherein said leg sections are fixed to said shank by said heat-shrunk tubing.

25. The fishhook of claim 18, wherein said shank includes an eyelet at said rearward end thereof, and wherein said bend of said auxiliary wire member is positioned within said eyelet with said pair of leg sections extending forwardly along said shank.

26. The fishhook of claim 25, wherein said pair of leg sections are surrounded by said heat-shrunk tubing so as to positionally fix said pair of leg sections to said shank.

27. The fishhook of claim 18, wherein said pair of leg sections are surrounded by said heat-shrunk tubing so as to positionally fix said pair of leg sections to said shank.

28. The fishhook of claim 27, wherein said shank includes a pair of substantially 90° bends which axially offset said rearward end of said shank, and wherein said bend of said auxiliary wire member is engaged with a projecting section of said shank between said pair of substantially 90° bends thereof.

29. A fishhook comprising:

a shank;

a shank barb;

a heat-shrunk tubing section which positionally fixes said shank barb to said shank; and a flexible wire guard having one end fixed to said shank by said heat-shrunk tubing section, wherein said shank barb is formed by a turned-back segment of said one end of said flexible wire which extends outwardly from said heat-shrunk tubing section.

* * * * *